United States Patent [19]

Lukach et al.

[11] 3,781,153

[45] Dec. 25, 1973

[54] DISK EXTRUDER FOR PROCESSING POLYMERIC MATERIALS

[76] Inventors: Jury Efimovich Lukach, ulitsa Tolstogo, 15, kv. 43; Vladimir Alexeevich Senatos, Brest-Litovsky prospekt, 106/2, kv. 182; Arkady Demyanovich Petukhov, ulitsa Saljutnaya, 19, kv. 77, all of Kiev, U.S.S.R.

[22] Filed: Dec. 22, 1971

[21] Appl. No.: 210,896

[52] U.S. Cl. .............................. 425/207, 425/381.2
[51] Int. Cl. ............................................. B29h 1/10
[58] Field of Search ................ 425/381.2, 207, 208, 425/209

[56] References Cited
UNITED STATES PATENTS

| | | | |
|---|---|---|---|
| 3,676,035 | 7/1972 | Eckhardt | 425/208 X |
| 3,689,182 | 9/1972 | Kovacs | 425/208 |
| 3,310,835 | 3/1967 | Morozov et al. | 425/381.2 X |
| 3,122,788 | 3/1964 | Lieberman | 425/381.2 X |

Primary Examiner—H. A. Kilby, Jr.
Attorney—Eric H. Waters et al.

[57] ABSTRACT

A disk extruder for processing polymeric materials, comprising a movable disk mounted in a housing and having the shape of a cup accommodating a stationary disk. Confined between the movable disk and the housing is one working space, and between the movable and stationary disks — another working space. The other working space is fed with the material to be processed through cuts made in the side wall of the movable disk.

4 Claims, 2 Drawing Figures

DISK EXTRUDER FOR PROCESSING POLYMERIC MATERIALS

The present invention relates to machines used for processing thermoplastic polymeric materials and, more particularly, to disk extruders which can be used for manufacturing sheets, films, pipes and shaped articles, as well as for feeding other machines, such as casting ones, with molten polymer.

Widely used at present for making articles from a plastic mass is a disk extruder comprising a housing which accommodates a movable disk forming together with the housing a working space communicated with the charge and discharge openings for the material being processed, made in the housing, and a drive rotating the movable disk (cf. French Pat. No. 1,432,397).

From the charge opening made in the housing the material to be processed is delivered into the working space, melts down during intensive mixing due to friction forces arising in the material when the latter gets into the gap between the housing and the movable disk rotated by the drive. Owing to viscous and elastic forces, the polymeric melt thus formed moves to the central portion of the working space communicated with the discharge opening in the housing, and leaves the disk extruder.

Such a design of the disk extruder provides for a relatively low efficiency and low pressure of the material being processed at the outlet of the disk extruder, which necessitates employment of disk extruders having great overall dimensions. The efficiency of the conventional disk extruder is limited by the volume of the working space, and enlargement of the latter at the expense of the width results, in its turn, in a lower quality of the extruder. At the same time, enlargement of the diameter of the disk results in great over-all dimensions and, besides, an excessive enlargement of the diameter of the disk necessitates reduction of the rate of rotation of the disk, as in this case the rates of the material shifting bring about overheating (destruction) of the material. The outlet pressure of the material being processed, caused by the viscous and elastic properties of the material, is insufficient for suppressing the resistance forces of the moulding head connected to the discharge opening of the disk extruder, which makes it necessary to install additional devices to provide for a higher pressure at the outlet of the disk extruder.

It is an object of the present invention to provide such a disk extruder which, as compared to the conventional one, would provide for its higher efficiency and a higher pressure at the outlet without changing the width and diameter of the disk.

This object is accomplished by that in a disk extruder for processing polymeric materials, comprising a housing accommodating a movable disk whose side wall forms together with the housing an annular gap communicated with a charge opening for the material being processed, made in the housing, and end face forms together with the housing a working space communicated with said annular gap and a discharge opening for the processed material, made in the housing, as well as a drive rotating the said movable disc, according to the present invention, the movable disk has the shape of a cup and has a stationary disk disposed inside thereof and forming together with the movable disk a working space communicated through an opening made in the central portion of the movable disk with the discharge opening of the housing, and through cuts made in the side wall of the movable disk — with the annular gap between the movable disk and the housing.

It is expedient to make the cuts made in the side wall of the movable disk as slots disposed along helical lines, which makes it possible to effect a forced feeding of the material being processed into the working spaces.

In order to raise the pressure at the outlet of the disk extruder, in the zone of the discharge opening the movable disk may be provided with a hollow screw conveyer having internal and external threadings forming together with respective coaxially disposed cylindrical projections of the housing and stationary disk two annular gaps used as discharge openings of the working spaces.

It is also expedient to mount the housing, movable and stationary disks of the extruder in such a manner that they could relatively displace in the axial direction to control the volumes of the working spaces.

The present design of the disk extruder having two working spaces disposed in one housing, makes it possible to raise its efficiency by two times, preserving, at the same time, the same overall dimensions of the disk extruder and slightly increasing the consumption of electric energy.

The following description of exemplary embodiments of the present invention is given with reference to the accompanying drawings, in which.

Figure 1:
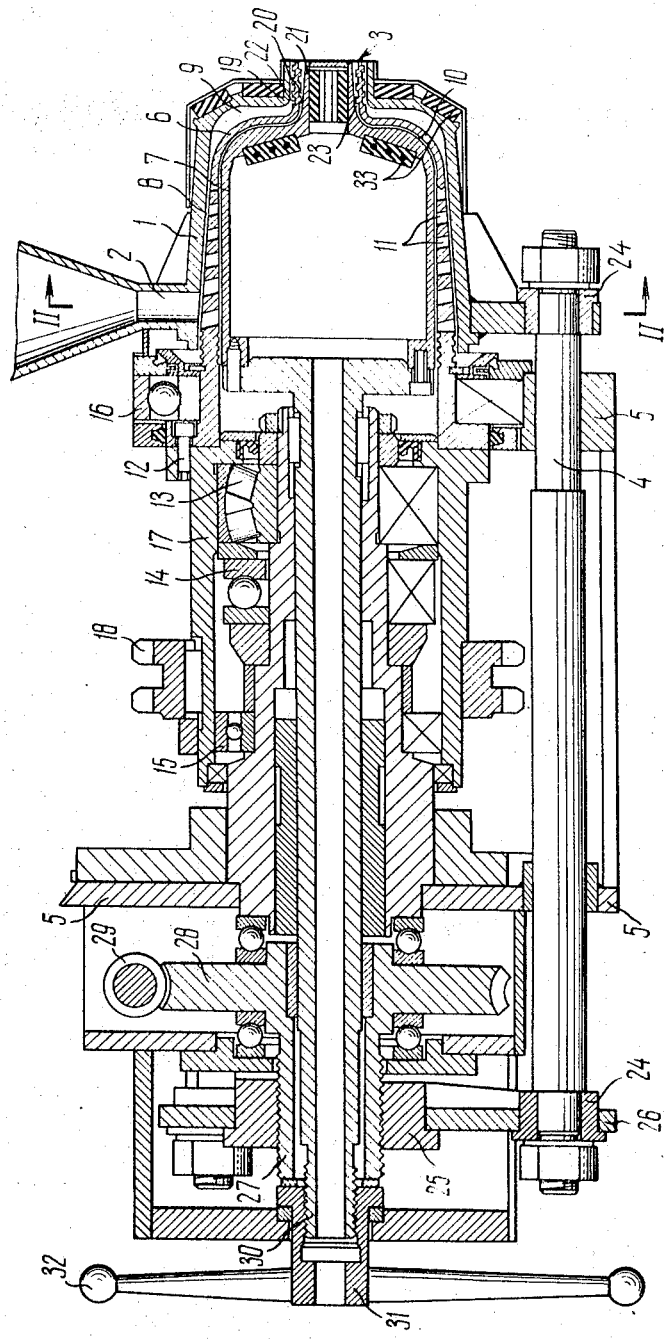
FIG. 1 shows a general view of a disk extruder according to the present invention, a longitudinal section.
Figure 2:
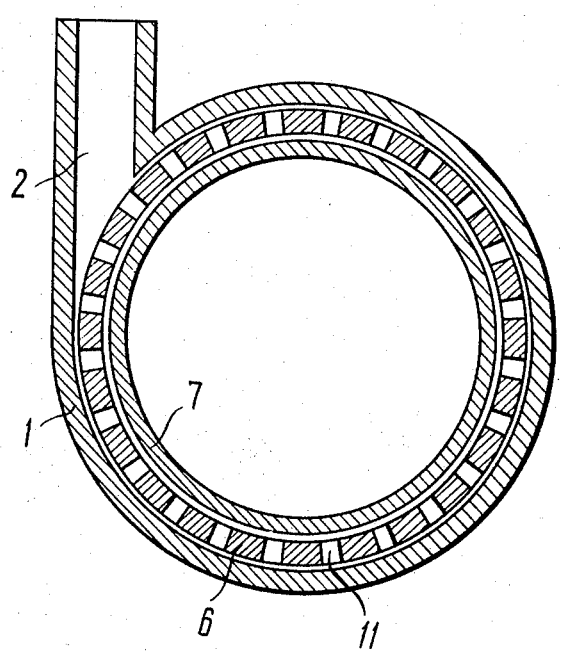
FIG. 2 is a section taken along line II—II of FIG. 1.

The disk extruder comprises a housing 1 (FIG. 1) with charge 2 and discharge 3 openings, mounted by means of rods 4 on a frame 5. The housing 1 accommodates a movable disk 6 fashioned as a cup and a stationary disk 7. Provided between the housing 1 and the movable disk 6 is an annular gap 8 and a working space 9. The annular gap 8 is formed by the side face of the disk 6 and the inner side of the housing 1. The working space 9 is confined by the end face of the movable disk 6 and the said inner side of the housing 1. The working space 9 and the annular gap 8 are communicated with each other and the charge 2 and discharge 3 openings of the housing 1. The stationary disk 7 forms together with the end face of the movable disk 6 an additional working space 10. The working space 10 is communicated with the charge opening 2 made in the housing 1 through the intermediary of cuts 11 (FIGS. 1 and 2) made in the side wall of the movable disk 6. The cuts 11 may be disposed in any portion of the side wall of the movable disk 6. In order to effect forced feeding of the working spaces with the material to be processed, the cuts 11 may be made as slots disposed along a helical line. For the same purpose the cuts 11 may be made directly before the working spaces 9 and 10 (FIG. 1), by having provided the side wall of the movable disk 6 with a spiral threading.

With the aid of bolts 12 the movable disk 6 is secured to a cup 17 with a star wheel 18, which is mounted movably by means of bearings 13, 14, 15, 16.

In order to raise the pressure at the outlet of the disk extruder, the walls of the discharge opening 3 of the housing 1 are formed by a cylindrical projection 19, and the movable disk 6 is provided with a hollow screw conveyer 20 having external and internal spiral threadings and entering the discharge opening 3 of the housing 1.

Provided on the stationary disk 7 is also a cylindrical projection 21. An annular gap 22 between the walls of the cylindrical projection 19 and the external spiral threading of the hollow screw conveyer 20 is used for discharging the material from the working space 9, and an annular gap 23 between the internal spiral threading of the hollow screw conveyer 20 and the walls of the cylindrical projection 21 — for discharging the material from the working space 10.

In order to raise the pressure of the material at the outlet of the disk extruder, it is possible to use a projection made as a smooth flat cylinder and substituting the hollow screw conveyer 20, and to provide with a spiral threading the surfaces of the cylindrical projections 19 and 21 made on the housing 1 and the stationary disk 7, corresponding thereto.

With the same purpose in view, the hollow screw conveyer 20 may be substituted with a projection made as a hollow cylinder having cuts disposed along helical lines.

In order to make it possible to control the width of the working space 9, the rods 4 are mounted movably on the frame 5 with the aid of bushings 24. The rods 4 are coupled with a nut 25 via a flange 26. The nut 25 is mounted on a thread rod 27 which is essentially a continuation of a worm wheel 28 which engages a worm 29.

In order to control the width of the working space 10, the stationary disk 7 is connected with the aid of a rod 30 whose end portion is provided with a threading with a threaded bushing 31 mounted on the frame 5 and having a handle 32.

During its starting-up the disk extruder is heated by heaters 33 mounted on the housing 1 and the stationary disk 7.

The disk extruder according to the present invention functions as follows.

From the motor the rotation is transmitted via a chain gear (not shown in the drawing) to the driving star wheel 18. The driving star wheel 18 rotates the cup 17 and the movable disk 6 connected therewith.

The material to be processed is supplied into the charge opening 2 disposed tangentially relative to the annular gap 8 in the housing 1, is gripped by the through cuts 11 and is fed into the working spaces 9 and 10. In the working spaces 9 and 10 the material is melted down, mixed and, due to viscous and elastic forces, is fed in the form of melt into the annular gaps 22 and 23.

With the aid of the hollow screw conveyer 20 the melt is removed from the working spaces 9 and 10 and is forced into the moulding head (not shown in the drawing) which is connected to the discharge opening 3 of the disk extruder.

Depending on the type of the material to be processed and predetermined efficiency of the disk extruder a required width of the working spaces 9 and 10 is set by the relative displacement in the axial direction of the housing 1 and the disks confining the said working spaces. The accompanying drawings show a variant of the axial displacement of the housing 1 and the stationary disk 7 relative to the movable disk 6. The control of the width of the working space 9 disposed between the housing 1 and the movable disk 6 is effected by rotating the worm 29. By rotating the worm 29 the nut 25 is displaced in the axial direction through the intermediary of the worm wheel 28 with the thread rod 27 to displace via the flange 26 and the rod 4 the housing 1.

In order to control the width of the working space 10 confined by the movable disk 6 and the stationary disk 7, the threaded bushing 31 is rotated by the handle 32. As a result of this, the rod 30 mounted in the threading of the bushing 31 displaces in the axial direction and makes follow it the stationary disk 7 rigidly connected thereto.

The width of the working spaces 9 and 10 may be adjusted during both operating and non-operating conditions of the disk extruder.

Employment of the disk extruder according to the present invention in industry will make it possible to considerably decrease the electric power consumed for processing polymeric materials, and to decrease the metal consumption and over-all dimensions of conventional units used for manufacturing articles from polymeric materials.

We claim:

1. A disk extruder for processing polymeric materials, comprising a housing; a movable disk having the shape of a cup and mounted inside the said housing; a side wall of the said movable disk forming together with the said housing an annular gap; an end face of the said movable disk forming together with the said housing a working space communicated with the said annular gap; a charge opening for the material to be processed, made in the said housing and communicated with the said annular gap; a discharge opening for the processed material, made in the said housing and communicated with the said working space; a drive for rotating the said movable disk; a stationary disk disposed inside the said movable disk and forming together therewith an additional working space; cuts provided in the said side wall of the movable disk to communicate the said additional working space with the said charge opening and with said annular gap; an opening made in the central portion of the said movable disk and used for communicating the said additional working space with the said discharge opening for the processed material.

2. A disk extruder as claimed in claim 1, wherein the said cuts made in the said side wall of the movable disk have the shape of slots arranged along helical lines.

3. A disk extruder as claimed in claim 1, which comprises a hollow screw conveyer with internal and external threadings, made on the said movable disk in the zone of the said discharge opening; a cylindrical projection provided on the said housing, disposed coaxially relative to the said hollow screw conveyer and forming together with its external surface an annular gap used for discharging the processed material from the said working space; a cylindrical projection provided on the said stationary disk, disposed coaxially relative to the said hollow screw conveyer and forming together with its internal surface an annular gap used for discharging the processed material from the said additional working space.

4. A disc extruder as claimed in claim 1, wherein the said housing, movable disk and stationary disk are so mounted that they can relatively displace in the axial direction.

* * * * *